ARRANGEMENT FOR IMPULSE MODULATION OF A MAGNETRON

Filed Jan. 21, 1960

INVENTOR
HUGO G. BRUIJNING.
BY Frank R. Jifari
AGENT

United States Patent Office 3,015,778

Patented Jan. 2, 1962

3,015,778 ARRANGEMENT FOR IMPULSE MODULATION OF A MAGNETRON

Hugo Georg Bruijning, Eindhoven, Netherlands, assignor to North American Philips Company, Inc., New York, N.Y., a corporation of Delaware Filed Jan. 21, 1960, Ser. No. 3,862
Claims priority, application Netherlands Feb. 6, 1959
5 Claims. (Cl. 328—67)

Figure 1:
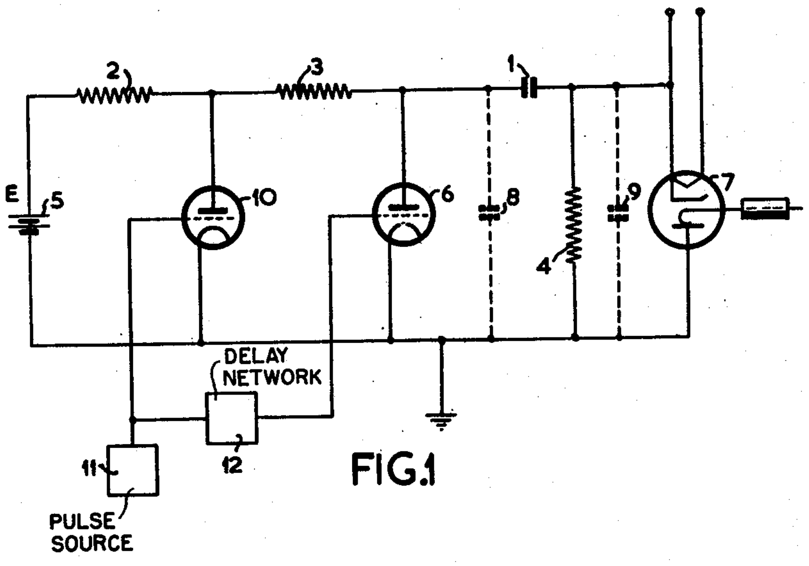

This invention relates to arrangements for impulse modulation of a magnetron.

In known arrangements, for example radar systems, frequently a magnetron is used to produce a transmitting pulse of high power, and for this purpose the magnetron is fed with a pulsatory direct voltage of high power.

In known arrangements for feeding a magnetron, a charged capacitor is periodically connected between the cathode and the anode of the magnetron. The capacitor discharges entirely or partially through a magnetron and by this means supplies the required power. In general, a discharge tube controlled so as to be periodically conductive is used as a switch. During a pulse, this tube must be capable of supplying a large current and between two pulses it must be capable of withstanding a high anode voltage.

The mean anode dissipation of the switching tube is proportional to the pulse repetition frequency. Hence, the pulse repetition frequency cannot exceed a certain limiting value which depends upon the maximum permissible anode dissipation of the tube.

When the capacitive element is discharged through the switching tube and the magnetron, only a small part of the electrical energy output of the capacitive element is wasted in the switching tube.

During each pulse, the stray capacitance of the switching tube is entirely discharged and the stray capacitance of the magnetron is charged through the switching tube to the supply voltage. Thus, not only a small part of the electric output energy of the capacitive element but also substantially the entire electric energy of the stray capacitances must always be dissipated in the anode of the switching tube. Owing to this energy dissipation the maximum pulse repetition frequency to be achieved by means of the modulator will be materially reduced.

With decrease in the pulse duration the electric energy of the stray capacitances forms an ever increasing part of the total energy dissipated in the anode during each pulse and the maximum obtainable pulse repetition frequency is determined nearly completely by this energy.

In general, the discharge tubes serving as switches do not have a large maximum permissible anode dissipation, since these tubes are built especially for a large anode current during the pulse at a low anode voltage, so that for this reason the dissipation is already slight and no allowance is made for other forms of energy to be dissipated.

The present invention has for its object to provide an arrangement for modulating a magnetron, in which the energy to be dissipated by the switch during each pulse is less than in the known arrangements.

In the arrangement in accordance with the invention, a charged capacitive element is discharged through a switch via the magnetron, and this arrangement is characterized in that a second switch is connected in series with a resistor in parallel with the first switch, means being provided for closing the second switch before the closure of the first switch.

The advantage of this arrangement consists in that the pulse repetition frequency can be much higher than in the known arrangements. The measure in accordance with the invention is the more effective, the smaller is the pulse duration.

In a preferred embodiment, the switches are discharge tubes, the control of the first switching tube being derived from that of the second switching tube by means of a delay network. This provides the advantage that the time interval between the instant at which the first switching tube is rendered conductive and the instant at which the second switching tube is rendered conductive, is exactly defined.

In order that the invention may readily be carried out, an embodiment thereof, will now be described, by way of example, with reference to the accompanying diagrammatic drawings, in which FIG. 1 shows an embodiment of an arrangement in accordance with the invention.

Figure 2:
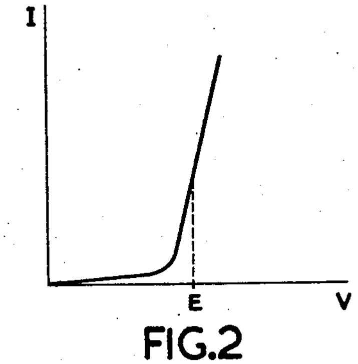

FIG. 2 is a diagram showing the static magnetron characteristic curve. In this diagram, the magnetron current is designated I and the anode to cathode voltage is designated V. E is the operating voltage of the magnetron.

In the embodiment of FIG. 1, a capacitor 1 is the capacitive element which is discharged through a magnetron 7 during each pulse. This capacitor 1 is charged by a supply source 5 to a voltage E through resistors 2, 3 and 4. To apply a pulse to the magnetron, tube 6 is rendered conductive enabling the charged capacitor 1 to discharge through the magnetron 7 and the tube 6. The energy lost by the capacitor during the discharge is substantially absorbed by the magnetron, since the internal impedance of the magnetron far exceeds that of the tube 6. Only a small part of the energy output of the capacitor 1 is converted into heat in the anode of the tube 6.

The stray capacitance 8 of the anode of the tube 6 and its supply leads are also charged by the supply source 5 through the resistors 2 and 3 during the period between two pulses. At the beginning of each pulse, the capacitance 8 discharges through the tube 6, while at the same time the stray capacitance 9 of the cathode of the magnetron 7 and its supply leads are charged by the capacitor 1 through the tube 6. The resulting energy variations of the capacitances 8 and 9 must be completely dissipated by the tube 6, since the discharge and charge circuits concerned include no resistances but the internal impedance of the tube 6. This effect might be slightly reduced by connecting a resistor in series with the tube 6. However, this resistor would be in series with the main pulse circuits comprising the tube 6, the magnetron 7 and the capacitor 1, so that the strength of the effective pulse would be reduced.

Only a small part of the decrease in energy of the capacitor 1 is dissipated by the tube 6, this energy decrease being smaller as the pulses are shorter. However short the pulses become, the total energy variation of the stray capacitances must always be dissipated. In spite of the fact that the stray capacitances are small compared to the capacitance of the capacitor 1, with short pulses the parasitic energy may become much greater than the energy converted into heat by the tube 6 when the capacitor 1 discharges.

In order to obviate these disadvantages, the anode of a tube 10 is connected to a tapping on the anode resistor 2, 3 of the tube 6. This tube 10 is rendered conductive a short time before the tube 6 is rendered conductive. Thus, the stray capacitance 8 discharges through the resistor 3 and the tube 10, while conversely the stray capacitance 9 is charged through the resistor 3 and the tube 10. The resistor 3 is large compared to the internal impedance of the tube 10, so that the energy variation of the stray capacitances 8 and 9 is largely dissipated in the resistor 3. The stray capacitance of the tube 10, which is charged by the supply source 5 through the resistor 2, also discharges through the tube 10. However, this capacitance is much smaller than that of the tube 6, the anode circuit of which includes a large capacitor 1 having a high stray capacitance to earth. The function of the tube 10 in series with the resistor 3 is to prepare the energy variation of the stray capacitances 8 and 9, which in the known arrangement occurs during each pulse, and to dissipate the greater part of this energy variation in the resistor 3. The resistor 3 is of the same order of magnitude as the resistor 4; preferably these resistors are equal. The interval between the instants at which the tube 10 and the tube 6 are rendered conductive may be chosen so that the voltage of the anode of the tube 6 has fallen to one half of its value and the voltage of the cathode of the magnetron 7 relative to the anode has fallen to one half of the supply voltage E. FIG. 2 shows that at this halved supply voltage the magnetron passes substantially no current and starts to oscillate. The energy variation occurring in the stray capacitances 8 and 9 when the tube 6 is rendered conductive, now is only ¼ of the total energy variation. Hence, the stray energy to be dissipated in the tube 6 is also reduced to ¼.

The capacitor 1 also discharges to a slight extent through resistor 3, tube 10 and resistor 4. However, the capacitance of this capacitor is so large that when the tube 6 is rendered conductive, substantially the entire initial energy is left. At the instant at which the tube 6 is rendered conductive, the voltage across the magnetron is increased to the voltage of the capacitor 1, that is to say, substantially to the supply voltage E. Now the magnetron fully oscillates and the capacitor 1 discharges through the magnetron and the tube 6. The tube 10 is controlled by a synchronizing device 11, which periodically renders the tube conductive by supplying positive voltage pulses to its grid. The device 11 also supplies positive voltage pulses to the grid of tube 6 through a delay network 12. Thus, the tube 6 is rendered conductive a short time after the tube 10, the duration of this time being determined by the delay of the network 13.

What is claimed is:

1. In a pulse modulation system of the type having serially connected first switch means, capacitor means and magnetron means, means for reducing the dissipation of energy in said first switch means comprising serially connected second switch means and resistance means connected in parallel with said first switch means, and means connected to close said second switch means before said first switch means is closed.

2. A pulse modulation system comprising a capacitor, means for charging said capacitor, a magnetron, means for discharging said capacitor through said magnetron comprising first switch means and means serially connecting said magnetron, first switch means and capacitor, and means for reducing the dissipation of energy in said first means comprising serially connected resistance means and second switch means, and means for closing said second switch means before said first switch means is closed to discharge said capacitor.

3. A pulse modulation system comprising a capacitor, means for charging said capacitor comprising a series connected circuit of first and second resistance means, said capacitor, third resistance means, and a source of voltage in that order, a magnetron connected in parallel with said third resistor, means for discharging said capacitor comprising first switch means connected in parallel with said capacitor and third resistor means, and means for reducing the dissipation of energy in said first switch means comprising second switch means connected in parallel with said serially connected source and first resistor means, and means for closing said second switch means before said first switch means is closed.

4. The system of claim 3, in which said first and second switch means are pulse controlled discharge tubes.

5. The system of claim 3, in which said second and third resistance means have substantially equal resistance.

References Cited in the file of this patent

UNITED STATES PATENTS

| | | |
|---|---|---|
| 2,735,022 | White | Feb. 14, 1956 |
| 2,942,190 | Fischman | June 21, 1960 |